UNITED STATES PATENT OFFICE.

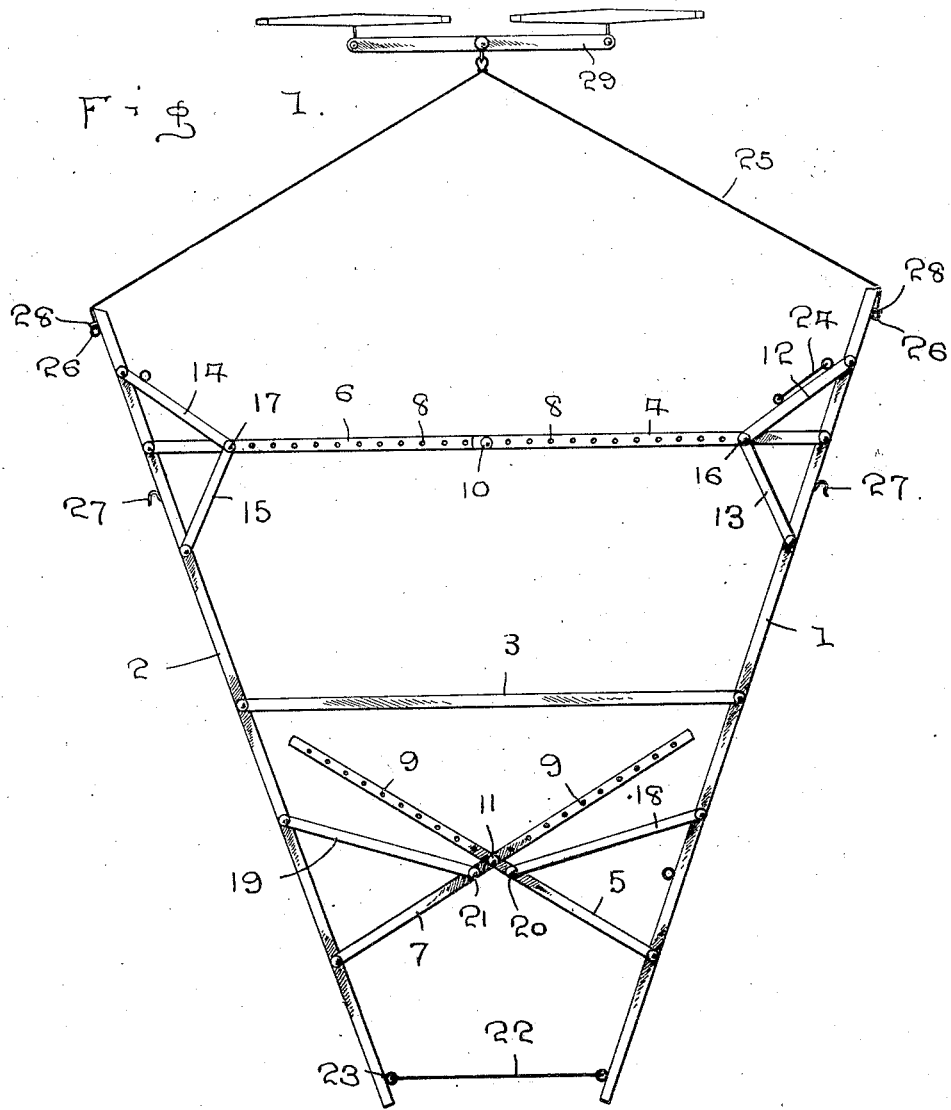

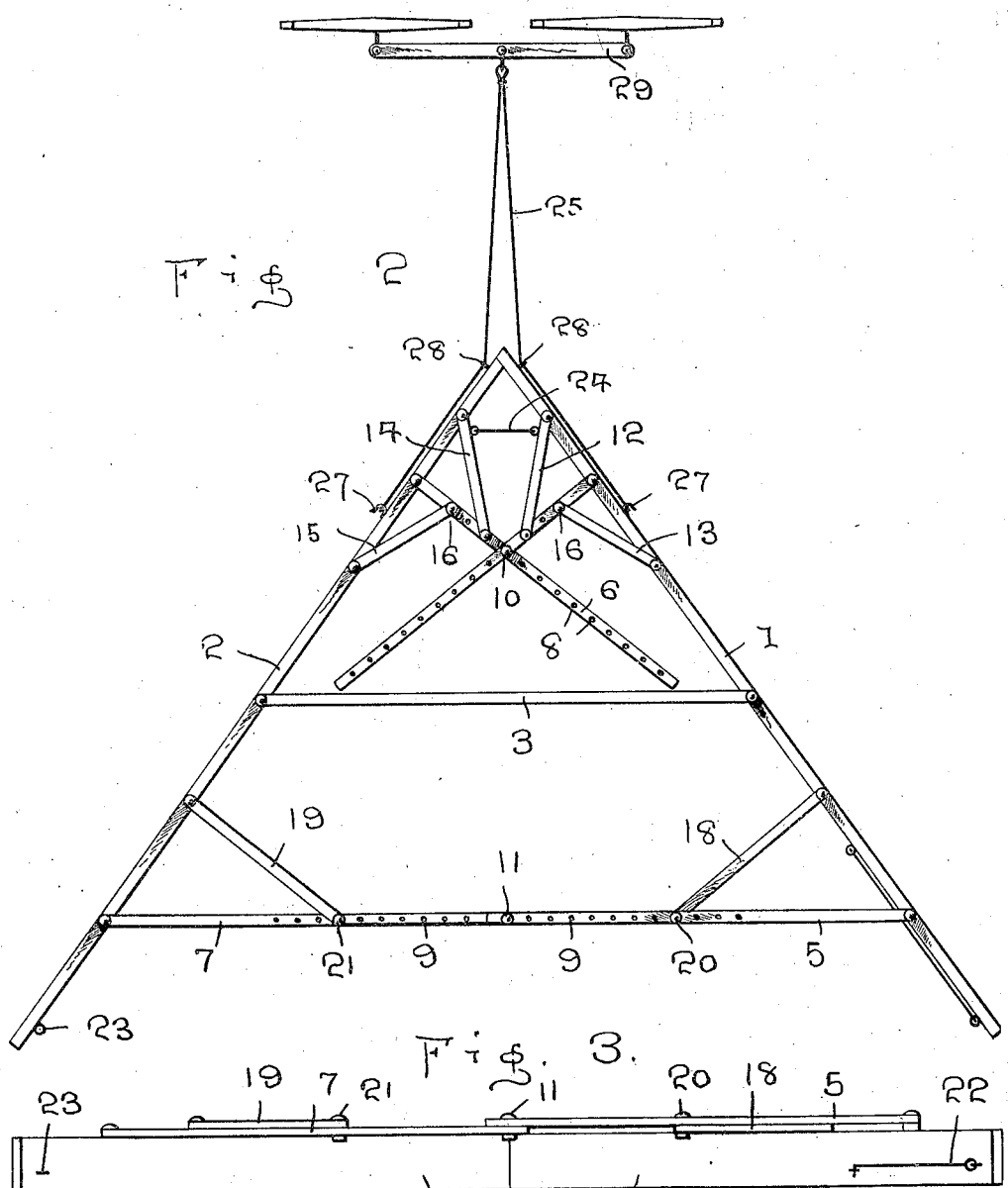

MICHAEL SHEAHAN, OF ENTERPRISE, OREGON.

COMBINED GRADER AND SNOW-PLOW.

No. 906,314.  Specification of Letters Patent.  Patented Dec. 8, 1908.

Application filed August 11, 1908. Serial No. 448,012.

*To all whom it may concern:*

Be it known that I, MICHAEL SHEAHAN, a citizen of the United States, residing at Enterprise, in the county of Wallowa and State of Oregon, have invented certain new and useful Improvements in a Combined Grader and Snow-Plow; and I do hereby declare the following to be a full, clear, and exact description of the invention, such as will enable others skilled in the art to which it appertains to make and use the same.

My invention relates to a combined grader and snow plow and my object is to provide a device of this class which may be readily and quickly adjusted to gather the soil and move the same to a common center or place the same in position to force soil or snow to opposite sides of the device, whereby a path will be formed.

A further object is to provide means for spacing the side rails of the device at various angles and a still further object is to provide means for readily attaching draft animals to the device.

Other objects and advantages will be hereinafter referred to and more particularly pointed out in the claims.

In the accompanying drawings which are made a part of this application, Figure 1 is a top plan view showing the same in position to move the soil to a common center as when used for grading purposes. Fig. 2 is a similar view showing the device in position to remove snow or the like to form a pathway, and, Fig. 3 is an end elevation of the device.

Referring to the drawings in which similar reference numerals designate corresponding parts throughout the several views, 1 and 2 indicate the side bars of my improved device, which bars are connected together adjacent their longitudinal centers by means of a coupling 3, said bars being pivotally secured to said coupling whereby they may be readily swung laterally to adjust the same at various angles.

Extending inwardly from the side bars 1 and 2 and adjacent the ends thereof are reach bars 4 and 5 and 6 and 7, respectively, said reach bars being arranged in pairs and adapted to overlap each other, each pair of the reach bars having registering openings 8 and 9, through which are adapted to extend locking bolts 10 and 11 and when the side bars are arranged to grade the soil or move the same to a common point, the reach bars 4 and 6 are coupled together adjacent their free ends by means of the locking bolt 10, while the reach bars 5 and 7 are secured together by means of the bolt 11 and as the rear ends of the side bars 1 and 2 are brought substantially together, the reach bars 5 and 7 are directed at an angle to each other and substantially in the form of the letter X, while the reach bars 4 and 6 extend in a common line with each other, these features being shown best in Fig. 1. When the reach bars are thus arranged, the forward ends of the side bars 1 and 2 are extended a considerable distance apart, so that the soil will be gathered over a considerable space and moved inwardly towards a common center as the device is moved forwardly and it will be readily seen that when the device is used for grading roadways, the soil at the side of the roadway will be moved towards the center of the roadway as is the common practice.

The forward pair of reach bars are reinforced or braced by means of straps 12 and 13, 14 and 15, the outer ends of the straps 12 and 13 being pivotally secured to the side bar 1, while the inner ends thereof are secured to the reach bar 4 by means of a bolt 16 while the outer ends of the straps 14 and 15 are likewise secured to the side bar 2 and their inner ends to the reach bar 6, by means of a bolt 17 and as the various straps are disposed at an angle to the longitudinal plane of their respective reach bars said bars will be securely braced and held against lateral movement. The reach bars 5 and 7 are also reinforced and braced by means of straps 18 and 19, respectively, the outer ends of said straps 18 and 19 being secured, respectively, to the side bars 1 and 2, while their inner ends are secured to the reach bars 5 and 7 by means of bolts 20 and 21, respectively, and as but single straps are used in connection with the reach bars 5 and 7, a rod 22 is extended from the side bar 1 and secured to an eye 23 on the side bar 2, said rod removing a portion of the strain from the straps 18 and 19 and reach bars 5 and 7.

When the device is used to remove snow or the like, the reach bars 5 and 7 are extended in a common line and the free ends thereof secured together by means of the bolt 11, the inner ends of the straps 18 and 19 being swung into position over the reach bars and secured thereto by means of their bolts 20 and 21, while the reach bars 4 and 6 are placed crosswise of each other as shown in Fig. 2, this arrangement of the pairs of cross bars bringing the forward ends of the side bars together, while the rear ends thereof will be separated, thus extending the side bars in V-shape, the apex thereof being at the forward end of the side bars, so that as the device is moved forwardly, the snow, etc., will be moved outwardly the distance between the rear ends of the side bars.

When the reach bars 4 and 6 are extended crosswise of each other, the inner ends of the straps 12 and 14 are secured to their respective reach bars at a different point from the straps 13 and 15, the anchoring points of said straps 13 and 15 being near the point of connection between the two reach bars and to add additional strength to the straps 12 and 14, they are connected together at a point adjacent their juncture with the side bars 1 and 2 by means of a link 24, as shown in Fig. 2.

Draft animals are attached to the device by providing a cable or chain 25, said cable being preferably doubled upon itself and having its ends provided with loops 26, which are adapted to engage hooks 27 when the device is being used for removing snow, said ends of the cable being entered through eyes 28 adjacent the forward ends of the side bars 1 and 2.

Secured to the cable 25 is the usual form of double tree 29, to which the draft animals are to be hitched and as the forward ends of the side bars are brought together when the device is used for removing snow, the draft animals are brought nearer the forward end of the device by extending the hooks 27 a distance from the forward ends of the side bars, but when the device is used for grading purposes and the forward ends thereof are separated, the loops 26 are removed from the hooks 27 and permitted to engage with the eyes 28, thus retaining the draft animals at substantially the same distance from the device at all times.

By providing the plurality of openings 8 and 9 in the various reach bars, it will be readily seen that the distance between said bars may be varied at will, in which event a narrower or wider path may be formed in the snow or the particles of the soil delivered in narrower or wider strips when the device is used as a grader.

What I claim is:

1. In a combined grader and snow plow, the combination with a pair of side bars and a coupling therefor; of reach bars arranged in pairs adjacent opposite ends of said side bars, the inner ends of said reach bars being adapted to overlap each other, means to secure said reach bars in their adjusted positions and brace straps extending between said reach bars and side bars.

2. In a combined grader and snow plow, the combination with side bars, a coupling bar having its ends pivoted to said side bars, reach bars pivoted to said side bars and arranged in pairs, said reach bars having a plurality of alining openings therein, pins adapted to enter said openings and hold the reach bars in their adjusted positions, straps extended between the side bars and reach bars to brace said reach bars, a cable for attaching draft animals to the side bars and means to adjustably attach the cable to the side bars.

In testimony whereof I have signed my name to this specification in the presence of two subscribing witnesses.

MICHAEL SHEAHAN.

Witnesses:
OLTRO S. KING,
N. S. FORSYTH.